United States Patent
Noguchi et al.

(10) Patent No.: US 11,306,204 B2
(45) Date of Patent: Apr. 19, 2022

(54) POLYPHENYLENE SULFIDE RESIN COMPOSITION, METHOD OF PRODUCING SAME, AND MOLDED ARTICLE

(71) Applicant: Toray Industries, Inc., Tokyo (JP)

(72) Inventors: Gen Noguchi, Nagoya (JP); Hisashi Yamanoue, Nagoya (JP); Kei Saito, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 149 days.

(21) Appl. No.: 16/759,943

(22) PCT Filed: Nov. 2, 2018

(86) PCT No.: PCT/JP2018/040806
§ 371 (c)(1),
(2) Date: Apr. 28, 2020

(87) PCT Pub. No.: WO2019/093237
PCT Pub. Date: May 16, 2019

(65) Prior Publication Data
US 2021/0179848 A1 Jun. 17, 2021

(30) Foreign Application Priority Data

Nov. 10, 2017 (JP) .............................. JP2017-216935
Aug. 31, 2018 (JP) .............................. JP2018-162599

(51) Int. Cl.
| | | |
|---|---|---|
| C08L 81/02 | (2006.01) | |
| B29B 7/48 | (2006.01) | |
| B29B 7/90 | (2006.01) | |
| C08K 5/5415 | (2006.01) | |
| C08K 5/5435 | (2006.01) | |
| C08K 5/544 | (2006.01) | |
| B29C 48/40 | (2019.01) | |
| B29C 48/625 | (2019.01) | |
| C08L 53/02 | (2006.01) | |
| B29B 7/88 | (2006.01) | |
| B29K 81/00 | (2006.01) | |

(52) U.S. Cl.
CPC ................ *C08L 81/02* (2013.01); *B29B 7/48* (2013.01); *B29B 7/90* (2013.01); *B29C 48/40* (2019.02); *B29C 48/625* (2019.02); *C08K 5/544* (2013.01); *C08K 5/5415* (2013.01); *C08K 5/5435* (2013.01); *B29B 7/88* (2013.01); *B29K 2081/04* (2013.01); *C08J 2381/04* (2013.01); *C08L 53/02* (2013.01)

(58) Field of Classification Search
CPC . C08L 71/02; C08L 81/02; B29B 7/88; B29C 48/285–2888
USPC .............................................. 366/76.1–76.93
See application file for complete search history.

(56) References Cited

U.S. PATENT DOCUMENTS

| | | | |
|---|---|---|---|
| 5,047,465 A | 9/1991 | Auerbach | |
| 5,070,127 A * | 12/1991 | Auerbach | ............... C08L 81/02 524/262 |
| 5,300,362 A | 4/1994 | Auerbach et al. | |
| 2014/0343215 A1* | 11/2014 | Ouchiyama | ............. C08L 81/04 524/500 |

FOREIGN PATENT DOCUMENTS

| | | |
|---|---|---|
| CN | 1718635 | 1/2006 |
| CN | 104419206 | 3/2015 |
| JP | 1-215854 | 8/1989 |
| JP | 3-64360 | 3/1991 |
| JP | 3-68101 | 3/1991 |
| JP | 4-246464 | 9/1992 |
| JP | 4-289284 | 10/1992 |
| JP | 2004-2560 | 1/2004 |
| JP | 2010-195962 | 9/2010 |
| JP | 2014-177504 | 9/2014 |
| JP | 2015-28112 | 2/2015 |
| JP | 2016-23263 | 2/2016 |
| WO | 2013/099234 | 7/2013 |

* cited by examiner

*Primary Examiner* — Marc S Zimmer
(74) *Attorney, Agent, or Firm* — DLA Piper LLP (US)

(57) ABSTRACT

A polyphenylene sulfide resin composition includes a polyphenylene sulfide resin (A); an aromatic vinyl compound block copolymer (B) containing at least one functional group selected from the group consisting of a carboxyl group, an acid anhydride group, a hydroxyl group, an amino group, an epoxy group and an isocyanate group; and an alkoxysilane compound (C) containing at least one functional group selected from the group consisting of an epoxy group, an amino group and an isocyanate group; wherein a phase structure of the polyphenylene sulfide resin composition is a sea-island structure in which the polyphenylene sulfide resin (A) forms a sea phase, and the aromatic vinyl compound block copolymer (B) forms an island phase dispersed in a number average dispersed particle size of 1,000 nm or less.

3 Claims, No Drawings

POLYPHENYLENE SULFIDE RESIN COMPOSITION, METHOD OF PRODUCING SAME, AND MOLDED ARTICLE

TECHNICAL FIELD

This disclosure relates to a polyphenylene sulfide resin composition having an excellent impact resistance strength and water pressure-resistant breaking strength. More particularly, the disclosure relates to a molded article, especially, a pipe component for use in a water application, which has an excellent water pressure-resistant breaking strength.

BACKGROUND

Polyphenylene sulfide resins (hereinafter, also abbreviated as PPS resins) belong to super engineering plastics having a high heat resistance, and are widely used in applications such as various electric and electronic components, components for consumer electronics, automotive components and mechanical components, because of their excellent mechanical strength, rigidity, flame resistance, chemical resistance, electrical properties and dimensional stability.

Conventionally, water application components such as pipe components for housing facilities and pipe components for water heaters, which are used to allow water to pass therethrough, have been mainly made of metals. Since metals have a high specific gravity and are poor in processability and in the degree of freedom in shape, resin materials capable of replacing metals have been required. However, usable resins and additives are limited, since water application components come into contact with a liquid which is directly taken into human body such as drinking water.

In water application components, an improvement in pressure-resistant breaking strength is essential since these components come into contact with a hot water flow, and a high water pressure comparable to the direct pressure of water supply system or a high water pressure due to water hammer is applied thereto. However, such properties are insufficient in molded articles composed of conventional PPS resin compositions, and thus the use thereof in water application components has been limited.

In a molded article composed of the PPS resin composition disclosed in JP 2015-28112A or JP 2016-23263 A, due to insufficient dispersibility of the aromatic vinyl compound block copolymer, a sufficient impact resistance strength and water pressure-resistant breaking strength cannot be obtained. As a result, the molded article has yet been insufficient to be used in an environment where a high water pressure is applied.

SUMMARY

We thus provide:

A polyphenylene sulfide resin composition including:

99.5 to 51 parts by weight of a polyphenylene sulfide resin (A);

0.5 to 49 parts by weight of an aromatic vinyl compound block copolymer (B) containing at least one functional group selected from the group consisting of a carboxyl group, an acid anhydride group, a hydroxyl group, an amino group, an epoxy group and an isocyanate group; and 0.1 to 2.0 parts by weight, with respect to 100 parts by weight of the total amount of the polyphenylene sulfide resin (A) and the aromatic vinyl compound block copolymer (B), of an alkoxysilane compound (C) containing at least one functional group selected from the group consisting of an epoxy group, an amino group and an isocyanate group;

wherein the morphology (phase structure) of the polyphenylene sulfide resin composition has a sea-island structure in which the polyphenylene sulfide resin (A) forms a continuous phase (sea phase), and the aromatic vinyl compound block copolymer (B) forms a dispersed phase (island phase) dispersed in a number average dispersed particle size of 1,000 nm or less.

A method of producing the polyphenylene sulfide resin composition includes:

a method of producing the above described polyphenylene sulfide resin composition, the method including performing melt-kneading using a twin screw extruder having a ratio L/D of screw length L to screw diameter D of 10 or more, at a melt-kneading energy E (kWh/kg), represented by equation (2), of 0.15 kWh/kg or more and 0.50 kWh/kg or less:

$$E=\{(A/B)\times C\}/F \tag{2}$$

wherein A represents the screw rotation speed (rpm) of the twin screw extruder during the melt-kneading; B represents the maximum screw rotation speed (rpm) of the twin screw extruder; C represents the output (kW) of a screw drive motor during the melt-kneading; and F represents the discharge amount (kg/h) of a molten resin during the melt-kneading.

A molded article is composed of the above described polyphenylene sulfide resin composition.

The polyphenylene sulfide resin composition preferably has a non-Newtonian index N of 1.5 or more, wherein the non-Newtonian index N is calculated based on the shear rate and the shear stress of the polyphenylene sulfide resin composition measured using a capillograph under the conditions of a temperature of 320° C. and a ratio of orifice length L to orifice diameter D of 40, in accordance with equation (1):

$$SR=K\cdot SS^N \tag{1}$$

wherein N represents the non-Newtonian index; SR represents the shear rate (1/sec); SS represents the shear stress (dyne/cm$^2$); and K represents a constant.

The aromatic vinyl compound block copolymer (B) preferably contains at least one functional group selected from an acid anhydride group and an amino group.

The alkoxysilane compound (C) preferably contains at least one functional group selected from an amino group and an epoxy group.

In the method of producing the polyphenylene sulfide resin composition, the screw rotation speed of the twin screw extruder is preferably 300 rpm or more.

The resin temperature at the die exit of the twin screw extruder is preferably 400° C. or lower.

It is preferred that the twin screw extruder includes: a cylinder; a main feed port provided to the cylinder; and a side feed port provided on the downstream side of the main feed port in the extrusion direction; and that the aromatic vinyl compound block copolymer (B) is fed from the side feed port.

It is preferred that 80% to 98% by weight of the total amount of the aromatic vinyl compound block copolymer (B) is fed from the side feed port, and the remaining 2 to 20% by weight of the aromatic vinyl compound block copolymer (B) is fed from the main feed port.

The molded article preferably has a water pressure resistance strength of 9 MPa or more, when formed into a T-shaped fitting having an outer diameter of 21.7 mm and a thickness of 2.8 mm.

The molded article is preferably any one pipe component for a water application, selected from a toilet-related component, a water heater-related component, a bath-related component, a pump-related component and a water meter-related component.

By dispersing an aromatic vinyl compound block copolymer in not more than a certain particle size, in a polyphenylene sulfide resin, we enable improvement in the impact resistance strength and the water pressure-resistant breaking strength of the resulting molded article. As a result, we can provide a polyphenylene sulfide resin composition and a molded article obtained therefrom, capable of being used in water application components to which the direct pressure of water supply system or an internal water pressure due to water hammer is applied, which have hitherto been difficult.

DETAILED DESCRIPTION

Examples will now be described in detail.

The PPS resin (A) to be used is a polymer containing a repeating unit represented by structural formula:

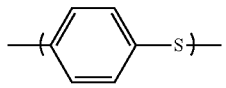

From the viewpoint of improving the heat resistance, a polymer containing 70% by mol or more of the repeating unit represented by the above described structural formula is preferred, and a polymer containing 90% by mol or more of the repeating unit is more preferred. Further, about less than 30% by mol of the PPS resin may be composed of repeating units having the following structures and the like.

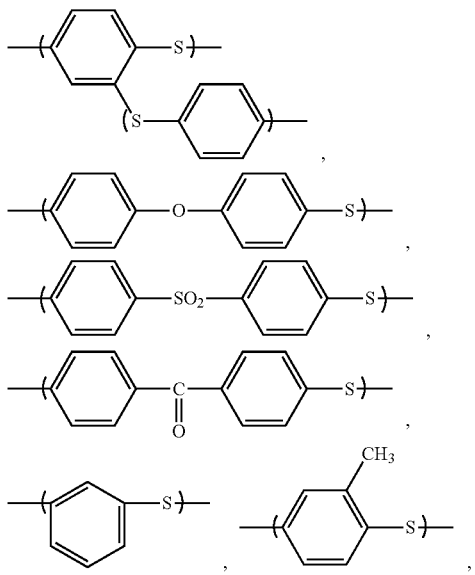

-continued

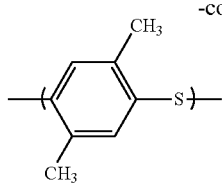

The method of producing the PPS resin will now be described. First, a description will be given of the details of a polyhalogenated aromatic compound, a sulfidation agent, a polymerization solvent, a molecular weight modifier, a polymerization auxiliary and a polymerization stabilizer, to be used.

Polyhalogenated Aromatic Compound

The "polyhalogenated aromatic compound" refers to a compound having two or more halogen atoms within one molecule. Specific examples include polyhalogenated aromatic compounds such as p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene and 1-methoxy-2,5-dichlorobenzene. Among these, p-dichlorobenzene is preferably used. It is also possible to use two or more different kinds of polyhalogenated aromatic compounds to form a copolymer. However, it is preferred that p-dihalogenated aromatic compound be used as a main component.

From the viewpoint of obtaining a PPS resin having a viscosity suitable for processing, the amount to be used of the polyhalogenated aromatic compound is, for example, 0.9 to 2.0 mol, preferably 0.95 to 1.5 mol, and still more preferably 1.005 to 1.2 mol, with respect to 1 mol of the sulfidation agent.

Sulfidation Agent

The sulfidation agent may be, for example, an alkali metal sulfide, an alkali metal hydrosulfide, or a hydrogen sulfide.

Specific examples of the alkali metal sulfide include: lithium sulfide, sodium sulfide, potassium sulfide, rubidium sulfide and cesium sulfide; and a mixture of two or more kinds thereof. Among these, sodium sulfide is preferably used. These alkali metal sulfides can be used in the form of a hydrate or an aqueous mixture, or alternatively, in the form of an anhydride.

Specific examples of the alkali metal hydrosulfide include: sodium hydrosulfide, potassium hydrosulfide, lithium hydrosulfide, rubidium hydrosulfide and cesium hydrosulfide; and a mixture of two or more kinds thereof. Among these, sodium hydrosulfide is preferably used. These alkali metal hydrosulfides can be used in the form of a hydrate or an aqueous mixture, or alternatively, in the form of an anhydride.

It is also possible to use a sulfidation agent prepared from an alkali metal hydrosulfide and an alkali metal hydroxide, in situ, in the reaction system. Further, it is possible to prepare a sulfidation agent from an alkali metal hydro sulfide and an alkali metal hydroxide, and to transfer the resulting sulfidation agent to a polymerization vessel for use.

Alternatively, a sulfidation agent prepared from an alkali metal hydroxide such as lithium hydroxide or sodium hydroxide, and a hydrogen sulfide, in situ, in the reaction system can also be used. Further, it is possible to prepare a sulfidation agent from an alkali metal hydroxide such as lithium hydroxide or sodium hydroxide, and a hydrogen sulfide, and to transfer the resulting sulfidation agent to a polymerization vessel for use.

When a partial loss of the sulfidation agent occurs before the start of the polymerization reaction, due to a dehydration operation or the like, the charged amount of the sulfidation agent refers to the remaining amount of the sulfidation agent, determined by subtracting the amount of the loss from the actually charged amount.

Along with the sulfidation agent, an alkali metal hydroxide and/or an alkaline earth metal hydroxide can also be used, in combination. Specific examples of a preferred alkali metal hydroxide include: sodium hydroxide, potassium hydroxide, lithium hydroxide, rubidium hydroxide and cesium hydroxide; and a mixture of two or more kinds thereof. Specific examples of the alkaline earth metal hydroxide include calcium hydroxide, strontium hydroxide, and barium hydroxide. Among these, sodium hydroxide is preferably used.

When an alkali metal hydrosulfide is used as the sulfidation agent, it is particularly preferred that an alkali metal hydroxide be used at the same time. The amount of the alkali metal hydroxide to be used at this time is, for example, 0.95 to 1.20 mol, preferably 1.00 to 1.15 mol, and more preferably 1.005 to 1.100 mol, with respect to 1 mol of the alkali metal hydrosulfide.

Polymerization Solvent

As the polymerization solvent, an organic polar solvent is preferably used. Specific examples include: N-alkylpyrrolidones such as N-methyl-2-pyrrolidone and N-ethyl-2-pyrrolidone; caprolactams such as N-methyl-ε-caprolactam; aprotic organic solvents represented by 1,3-dimethyl-2-imidazolidinone, N,N-dimethylacetamide, N,N-dimethylformamide, hexamethyl phosphoric acid triamide, dimethyl sulfone, tetramethylene sulfoxide and the like; and a mixture of these. All of these solvents have a high reaction stability, and thus are preferably used. Among these, N-methyl-2-pyrrolidone (hereinafter, sometimes abbreviated as NMP) is particularly preferably used.

The amount to be used of the organic polar solvent is preferably 2.0 mol to 10 mol, more preferably 2.25 to 6.0 mol, and still more preferably 2.5 to 5.5 mol, with respect to 1 mol of the sulfidation agent.

Molecular Weight Modifier

For the purpose of facilitating the terminal formation of the PPS resin to be produced, or alternatively, for the purpose of controlling the polymerization reaction or the molecular weight of the resulting polymer, a monohalogen compound (does not necessarily have to be an aromatic compound) can be used in combination with the above described polyhalogenated aromatic compound.

Polymerization Auxiliary

It is also preferred examples to use a polymerization auxiliary to obtain a PPS resin having a relatively high degree of polymerization within a shorter period of time. The "polymerization auxiliary" as used herein refers to a substance that increases the viscosity of the resulting PPS resin. Specific examples of such a polymerization auxiliary include organic carboxylate salts, water, alkali metal chlorides, organic sulfate salts, alkali metal sulfate salts, alkaline earth metal oxides, alkali metal phosphate salts and alkaline earth metal phosphate salts. These can be used singly, or two or more kinds thereof can be used simultaneously. Among these, an organic carboxylate salt and/or water is/are preferably used.

"Alkali metal carboxylate salt" refers to a compound represented by general formula: $R(COOM)_n$ wherein R represents an alkyl group, a cycloalkyl group, an aryl group, an alkylaryl group or an arylalkyl group having from 1 to 20 carbon atoms; M represents an alkali metal selected from lithium, sodium, potassium, rubidium and cesium; and n represents an integer from 1 to 3. The alkali metal carboxylate salt can be used in the form of a hydrate, an anhydride or an aqueous solution. Specific examples of the alkali metal carboxylate salt include: lithium acetate, sodium acetate, potassium acetate, sodium propionate, lithium valerate, sodium benzoate, sodium phenylacetate and potassium p-toluate; and a mixture thereof.

The alkali metal carboxylate salt may be formed by adding substantially equal chemical equivalents of an organic acid, and one or more kinds of compounds selected from the group consisting of an alkali metal hydroxide, an alkali metal carbonate salt and an alkali metal bicarbonate salt, to allow a reaction to occur. Among the above described alkali metal carboxylate salts, a lithium salt is preferably used, since it has a high solubility in a reaction system and thus provides a high auxiliary effect. Sodium acetate, which is inexpensive and has a moderate solubility in a polymerization system, is most preferably used.

In any of these polymerization auxiliaries, a preferred amount of the polymerization auxiliary to be used is usually 0.01 mol to 0.7 mol with respect to 1 mol of the charged alkali metal sulfide. From the viewpoint of obtaining a higher degree of polymerization, the amount to be used thereof is more preferably 0.1 to 0.6 mol, and still more preferably 0.2 to 0.5 mol.

The use of water as a polymerization auxiliary is one of the effective means for obtaining a resin composition in which flowability and a high toughness are highly balanced. In this example, a preferred amount of water to be added is usually 0.5 mol to 15 mol with respect to 1 mol of the charged alkali metal sulfide. From the viewpoint of obtaining a higher degree of polymerization, the amount to be used thereof is more preferably 0.6 to 10 mol, and still more preferably 1 to 5 mol.

The timing for adding the polymerization auxiliary is not particularly limited. The polymerization auxiliary may be added at any time point selected from during the pre-processing step to be described later, at the start of the polymerization and during the polymerization, and may be added multiple times in divided amounts. When an alkali metal carboxylate salt is used as the polymerization auxiliary, it is more preferred that the alkali metal carboxylate be added all at once, at the start of the pre-processing step or at the start of the polymerization, because the addition can be carried out easily. Further, in using water as the polymerization auxiliary, it is effective and thus preferred to add water after charging the polyhalogenated aromatic compound and during the polymerization reaction.

Polymerization Stabilizer

For the purpose of stabilizing the polymerization reaction system and to prevent a side reaction, it is also possible to use a polymerization stabilizer. The polymerization stabilizer contributes to the stabilization of the polymerization reaction system, and inhibits an undesired side reaction. For example, generation of thiophenol may be used as one of the guides for determining the occurrence of a side reaction, and generation of thiophenol can be inhibited by the addition of a polymerization stabilizer. Specific examples of the polymerization stabilizer include compounds such as alkali metal hydroxides, alkali metal carbonate salts, alkaline earth metal hydroxides and alkaline earth metal carbonate salts. Among these, alkali metal hydroxides such as sodium hydroxide, potassium hydroxide and lithium hydroxide are preferred. The above described alkali metal carboxylate salts are also included in the definition of the polymerization stabilizer since each of these acts as a polymerization stabilizer. It has been described above that, in an alkali metal hydrosulfide as the sulfidation agent, it is particularly preferred to use an alkali metal hydroxide at the same time. An alkali metal hydroxide in excess with respect to the amount of the sulfidation agent can also serve as a polymerization stabilizer.

These polymerization stabilizers can be used singly, or two or more kinds thereof can be used in combination. A preferred amount of the polymerization stabilizer to be used is usually 0.02 to 0.2 mol, more preferably 0.03 to 0.1 mol, and still more preferably 0.04 to 0.09 mol, with respect to 1 mol of the charged alkali metal sulfide. When the polymerization stabilizer is used in the above described preferred range, a sufficient stabilizing effect and economic efficiency can be achieved, allowing for an increase in polymer yield.

The timing for adding the polymerization stabilizer is not particularly limited. The polymerization stabilizer may be added at any time point selected from during the pre-processing step to be described later, at the start of the polymerization and during the polymerization, and may be added multiple times in divided amounts. However, it is more preferred that the polymerization stabilizer be added all at once, at the start of the pre-processing step or at the start of the polymerization.

Next, the pre-processing step, a polymerization reaction step and a recovery step will be specifically described in the order mentioned.

Pre-Processing Step

In the polymerization of the PPS resin, the sulfidation agent is usually used in the form of a hydrate. Before addition of the polyhalogenated aromatic compound, it is preferred that a mixture containing an organic polar solvent and the sulfidation agent be heated to remove an excessive amount of water out of the system. When this operation causes an excessive removal of water, it is preferred to add water to compensate for the shortage.

Further, as described above, it is possible to use, as the sulfidation agent, an alkali metal sulfide prepared from an alkali metal hydrosulfide and an alkali metal hydroxide, in situ, in the reaction system, or alternatively, an alkali metal sulfide prepared in a vessel separate from the polymerization vessel. The method of carrying out this operation is not particularly limited. However, this operation may be carried out, for example, by a method in which an alkali metal hydrosulfide and an alkali metal hydroxide are added to an organic polar solvent, preferably in an inert gas atmosphere at a temperature range of normal temperature to 150° C., and more preferably from normal temperature to 100° C., and the resulting mixture is heated preferably to 150° C. or higher, and more preferably to 180 to 245° C., under normal pressure or a reduced pressure, thereby removing water by distillation. A polymerization auxiliary may be added at this stage. Further, to facilitate the removal of water by distillation, the reaction may be carried out with the addition of toluene or the like.

The amount of water in the polymerization system, in the polymerization reaction, is preferably 0.5 to 10.0 mol with respect to 1 mol of the charged sulfidation agent. The "amount of water in the polymerization system" as used herein refers to the amount determined by subtracting the amount of water removed out of the polymerization system, from the amount of water charged into the polymerization system. Further, the water to be charged may be in any form such as, for example, water, an aqueous solution or crystal water.

Polymerization Reaction Step

It is preferred that the sulfidation agent be allowed to react with the polyhalogenated aromatic compound in an organic polar solvent at a temperature of 200° C. or higher and less than 290° C., to produce a particulate PPS resin.

At the time of starting the polymerization reaction step, the sulfidation agent and the polyhalogenated aromatic compound are added to the organic polar solvent, preferably in an inert gas atmosphere at a temperature range of normal temperature to 215° C., more preferably 100 to 215° C. A polymerization auxiliary may be added at this stage. These raw materials may be charged in an arbitrary order, and may be charged all at once.

It is preferred that the resulting mixture be heated usually to 200° C. to 290° C. The temperature rise rate is not particularly limited. However, it is preferred to select a temperature rise rate of usually 0.01 to 5° C./min, and more preferably 0.1 to 3° C./min.

In general, the mixture is preferably heated to a final temperature of 250 to 290° C., and it is preferred that the resultant be allowed to react at that temperature usually for 0.25 to 50 hours, and more preferably for 0.5 to 20 hours.

To obtain a higher degree of polymerization, it is effective and thus preferred to use a method in which the mixture is allowed to react at the stage before reaching the final temperature, for example, at a temperature of 200° C. to 245° C., for a certain period of time, and then heated to 270 to 290° C. At this time, it is preferred that the reaction time at a temperature of 200° C. to 245° C. usually be 0.25 hours to 20 hours, and more preferably 0.25 to 10 hours.

For the purpose of obtaining a polymer having a higher degree of polymerization, it is effective to carry out the polymerization in a plurality of stages. In carrying out the polymerization in a plurality of stages, it is effective to carry out the polymerization at the time point when the conversion rate of the polyhalogenated aromatic compound in the system at 245° C. reaches preferably 40% by mol or more, and more preferably 60% by mol.

Recovery Step

In the method of producing the PPS resin, solids are recovered from a polymerization reaction product containing the polymer, solvent and the like after the completion of the polymerization. The recovery may be carried out using any known method.

For example, a method may be used in which, after the completion of the polymerization reaction, the reaction product is allowed to cool slowly to recover a polymer in the form of particles. It is preferred that the slow-cooling at this time be carried out usually at a rate of about 0.1° C./min to 3° C./min, but not particularly limited thereto. The slow-cooling need not be carried out at the same cooling rate over the entire cooling process, and a method may be used, for example, in which the slow-cooling is carried out at a rate of 0.1 to 1° C./min until polymer particles are crystallized and precipitated and, thereafter, at a rate of 1° C./min or more.

It is also one of the preferred methods to carry out the above described recovery under rapid cooling conditions. One preferred example of this recovery method may be the flash method. The "flash method" refers to a method in which a polymerization reaction product is "flashed" from a high temperature and high pressure state (usually, a temperature of 250° C. or higher, and a pressure of 8 kg/cm$^2$ or more) into a normal pressure or reduced pressure atmosphere, to simultaneously achieve the recovery of the solvent and the recovery of the resulting polymer in the form of a powder. The term "flash" refers to injecting the polymerization reaction product from a nozzle. The atmosphere into which the polymerization reaction product is flashed may specifically be, for example, nitrogen or water vapor under normal pressure, and it is preferred that the temperature of the atmosphere usually be 150° C. to 250° C.

The flash method is a recovery method excellent in economic efficiency since the recovery of the solvent can be achieved at the same time as the recovery of the solids, within a relatively short period of time. In this recovery method, an ionic compound represented by Na or an organic low molecular weight polymerization product (an oligomer) tends to be incorporated into the resulting polymer, during the solidification process.

Post-Processing Step

It is important that the PPS resin, for example, a PPS resin obtained through the above described polymerization reaction step and recovery step be subjected to an acid treatment.

The acid to be used in the acid treatment is not particularly limited as long as the acid does not have an action to decompose the PPS resin. Examples of the acid include acetic acid, hydrochloric acid, sulfuric acid, phosphoric acid, silicic acid, carbonic acid and propylic acid. Among these, acetic acid and hydrochloric acid are more preferably used. An acid which causes the decomposition and degradation of the PPS resin such as nitric acid, cannot not be used.

Water to be used when preparing an aqueous solution of an acid is preferably distilled water or deionized water. An aqueous solution of an acid preferably has a pH of 1 to 7, and more preferably has a pH of 2 to 4. When the aqueous solution has a pH within the above described preferred range, an increase in the metal content in the PPS resin can be prevented, and at the same time, an increase in the amount of volatile components in the PPS resin can also be prevented.

The acid treatment is preferably carried out by a method in which the PPS resin is immersed in an acid or in an aqueous solution of an acid. If necessary, it is also possible to carry out stirring and heating, as appropriate. The heating is preferably carried out at a temperature of 80 to 250° C., more preferably 120 to 200° C., and still more preferably 150 to 200° C. When the heating is carried out within the above described preferred temperature range, a sufficient effect of the acid treatment is obtained, and an increase in the metal content can be prevented. At the same time, the pressure is prevented from being too high, and thus preferred in terms of safety. Further, when the PPS resin is treated by immersing the resin in an aqueous solution of an acid, the pH of the PPS resin is preferably adjusted to less than 8, and more preferably 2 to 8, by the acid treatment. When the pH is within the above described preferred range, an increase in the metal content in the resulting PPS resin can be prevented.

The acid treatment is preferably carried out for a period of time until the reaction of the PPS resin with the acid reaches a sufficient equilibrium. In carrying out the acid treatment at 80° C., the treatment time is preferably 2 to 24 hours, and in carrying out the treatment at 200° C., the treatment time is preferably 0.01 to 5 hours.

The acid treatment is preferably carried out where the PPS resin is sufficiently immersed in an acid or an aqueous solution of an acid, and the ratio of the PPS resin and the acid or the aqueous solution of the acid is preferably such that 0.5 to 500 L, more preferably 1 to 100 L, and still more preferably 2.5 to 20 L of the acid or the aqueous solution of the acid is used with respect to 500 g of the PPS resin. When the ratio of the PPS resin and the acid or the aqueous solution of the acid is within the above described preferred range, it can be expected that the PPS resin is sufficiently immersed in the aqueous solution to allow for sufficient washing, and an increase in the metal content in the PPS resin can be prevented. At the same time, since the amount of the solution is not in large excess with respect to the PPS resin, there is no risk that the production efficiency is significantly decreased.

Such an acid treatment is carried out by: a method in which a predetermined amount of the PPS resin is introduced into predetermined amounts of water and an acid, followed by heating and stirring in a pressure container; a method in which the acid treatment is carried out continuously. To separate the aqueous solution and the PPS resin from the treatment solution after the acid treatment, a method using a sieve or a filter can be used easily. Examples of such a method include natural filtration, pressure filtration, filtration under reduced pressure and centrifugal filtration. It is preferred that the PPS resin separated from the treatment liquid be washed with water or hot water several times to remove the acid and impurities remaining on the surface of the PPS resin. Washing can be carried out, for example, by a method in which filtration is carried out by pouring water onto the PPS resin placed on a filtration apparatus, or a method in which the separated PPS resin is charged into water prepared in advance, and then subjected to filtration again, thereby separating the aqueous solution and the PPS resin. The water to be used in the washing is preferably distilled water or deionized water. Although it is thought that changes occur in the terminal structure of the thus acid-treated PPS resin, it is difficult to represent the structure of the PPS resin obtained through the acid treatment, by a general formula, and to specify the structure of the resin by its properties. Thus, the structure of the resulting PPS resin can be specified only by the process (acid treatment) of obtaining the PPS resin.

A hydrothermal treatment is preferably carried out before performing the acid treatment. The method thereof is as follows. Water to be used in the hydrothermal treatment is preferably distilled water or deionized water. The hydrothermal treatment is preferably carried out at a temperature of 80 to 250° C., more preferably 120 to 200° C., and still more preferably 150 to 200° C. When the hydrothermal treatment is carried out within the above described preferred temperature range, a sufficient effect of the hydrothermal treatment is obtained, and an increase in the amount of volatile gas generated can be prevented. At the same time, the pressure is prevented from being too high, and thus preferred in terms of safety.

The hydrothermal treatment is preferably carried out for such a period of time that an extraction treatment of the PPS resin by hot water is sufficiently carried out. In carrying out the hydrothermal treatment at 80° C., the treatment time is preferably 2 to 24 hours, and in carrying out the treatment at 200° C., the treatment time is preferably 0.01 to 5 hours.

The hydrothermal treatment is preferably carried out where the PPS resin is sufficiently immersed in the water, and the ratio of the PPS resin and water in the hydrothermal treatment is preferably such that 0.5 to 500 L, more preferably 1 to 100 L, and still more preferably 2.5 to 20 L of water is used with respect to 500 g of the PPS resin. When the ratio of the PPS resin and the water is within the above described preferred range, it can be expected that the PPS resin is sufficiently immersed in the aqueous solution to allow for sufficient washing, and an increase in the amount of volatile gas generated can be prevented. At the same time, since the amount of water is not in large excess with respect to the PPS resin, there is no risk that the production efficiency is significantly decreased.

The operations for such a hydrothermal treatment are not particularly limited, and are carried out by: a method in which a predetermined amount of the PPS resin is introduced into a predetermined amount of water, followed by heating and stirring in a pressure container; a method in which the hydrothermal treatment is carried out continuously. The method of separating the aqueous solution and the PPS resin from the treatment solution after the hydrothermal treatment is not particularly limited, and a method using a sieve or a filter can be used easily. Examples of such a method include natural filtration, pressure filtration, filtration under reduced pressure and centrifugal filtration. It is preferred that the PPS resin separated from the treatment liquid be washed with water or hot water several times to remove the impurities remaining on the surface of the PPS resin. The method of washing is not particularly limited, and washing can be carried out, for example, by a method in which filtration is carried out by pouring water onto the PPS resin placed on a filtration apparatus, or a method in which the separated PPS resin is charged into water prepared in advance, and then subjected to filtration again, thereby separating the aqueous solution and the PPS resin. The water to be used in the washing is preferably distilled water or deionized water.

Further, to prevent the decomposition of the terminal groups of the PPS resin during the above described acid treatment and hydrothermal treatment, the acid treatment and the hydrothermal treatment are preferably carried out under an inert atmosphere. The inert atmosphere may be, for example, an atmosphere of nitrogen, helium or argon. From the viewpoint of economic efficiency, these treatments are preferably carried out under a nitrogen atmosphere.

The step of washing the PPS resin with an organic solvent may be carried out, before the step of performing an acid treatment and the step of performing a hydrothermal treatment. The method of carrying out the washing is as follows. The organic solvent to be used for washing the PPS resin is not particularly limited, as long as the solvent does not have an action to decompose the PPS resin and the like. Examples of the organic solvent include: nitrogen-containing polar solvents such as N-methyl-2-pyrrolidone, dimethylformamide, dimethylacetamide, 1,3-dimethylimidazolidinone, hexamethyl phosphorous amide and piperazinones; sulfoxide.sulfone-based solvents such as dimethyl sulfoxide, dimethyl sulfone and sulfolane; ketone-based solvents such as acetone, methyl ethyl ketone, diethyl ketone and acetophenone; ether-based solvents such as dimethyl ether, dipropyl ether, dioxane and tetrahydrofuran; halogen-based solvents such as chloroform, methylene chloride, trichloroethylene, ethylene dichloride, perchloroethylene, monochloroethane, dichloroethane, tetrachloroethane, perchloroethane and chlorobenzene; alcohol.phenol-based solvents such as methanol, ethanol, propanol, butanol, pentanol, ethylene glycol, propylene glycol, phenol, cresol, polyethylene glycol and polypropylene glycol; and aromatic hydrocarbon-based solvents such as benzene, toluene and xylene. Among these organic solvents, N-methyl-2-pyrrolidone, acetone, dimethylformamide, chloroform and the like are particularly preferably used. These organic solvents are used singly, or as a mixture of two or more kinds thereof.

Washing the PPS resin with an organic solvent can be carried out, for example, by a method in which the PPS resin is immersed in an organic solvent. If necessary, stirring and heating can be performed as appropriate. Washing the PPS resin with an organic solvent can be carried out at any temperature, without particular limitation, and an arbitrary washing temperature of normal temperature to about 300° C. can be selected. A higher washing temperature tends to result in a higher washing efficiency. However, a sufficient washing effect can be obtained usually at a washing temperature of normal temperature to 150° C. It is also possible to carry out washing in a pressure container, at a temperature equal to or higher than the boiling point of the organic solvent, under pressure. The period of time for carrying out washing is not particularly limited, as well. Although it depends on washing conditions, in carrying out washing in a batch system, a sufficient effect can usually be obtained by washing for 5 minutes or more. It is also possible to carry out washing in a continuous system.

The above described acid treatment, hydrothermal treatment and washing with an organic solvent can be carry out in combination, as appropriate.

It is possible to use a PPS resin obtained preferably by being subjected to a thermal oxidation treatment, after the above described acid treatment, hydrothermal treatment and/or washing with an organic solvent. The thermal oxidation treatment refers to subjecting the PPS resin to a heat treatment under an oxygen atmosphere, or to a heat treatment with the addition of a peroxide such as $H_2O_2$ or a vulcanizing agent such as sulfur. However, a heat treatment under an oxygen atmosphere is particularly preferred, because of the ease of the treatment.

The heating apparatus to be used for the thermal oxidation treatment of the PPS resin may be a common hot air dryer, or a rotary type heating apparatus or a heating apparatus equipped with a stirring blade. To carry out the treatment efficiently and more uniformly, it is more preferred to use a rotary type heating apparatus or a heating apparatus equipped with a stirring blade. It is desirable that the oxygen concentration in an atmosphere during the thermal oxidation treatment be 1% by volume or more, and more desirably 2% by volume or more. To obtain the desired effect, the upper limit of the oxygen concentration is preferably 5% by volume or less. When the thermal oxidation treatment is carried out at an oxygen concentration of 5% by volume or less, there is no risk that the thermal oxidation treatment proceeds excessively, and that the toughness of the molded article containing the PPS resin which has been subjected to the thermal oxidation treatment is impaired. When the thermal oxidation treatment is carried out at an oxygen concentration of 1% by volume or more, on the other hand, it is possible to perform a sufficient thermal oxidation treatment, and to obtain a PPS resin in which the amount of volatile components is reduced and, therefore, preferred.

The thermal oxidation treatment of the PPS resin is preferably carried out at a temperature of 160 to 270° C., and more preferably 160 to 230° C. When the thermal oxidation treatment is carried out at 270° C. or lower, there is no risk that the thermal oxidation treatment proceeds rapidly, and that the toughness of the molded article containing the PPS resin which has been subjected to the thermal oxidation treatment is impaired, and therefore preferred. When the thermal oxidation treatment is carried out at 160° C. or higher, on the other hand, it is possible to allow the thermal oxidation treatment to proceed at an appropriate rate, and to obtain a PPS resin in which the amount of volatile components generated is reduced and, therefore, preferred.

The thermal oxidation treatment is preferably carried out for a period of time of 0.5 to 30 hours, more preferably 0.5 to 25 hours, and still more preferably 2 to 20 hours. When the thermal oxidation treatment is carried out for 0.5 hours or more, it is possible to perform a sufficient thermal oxidation treatment, and to obtain a PPS resin in which the amount of volatile components is reduced, and therefore preferred. When the thermal oxidation treatment is carried out for 30 hours or less, a cross-linking reaction due to the thermal oxidation treatment can be controlled, and there is no risk that the toughness of the molded article containing the PPS resin which has been subjected to the thermal oxidation treatment is impaired, and therefore preferred.

The PPS resin suitably has a melt viscosity at 310° C. and at a shear rate of 1,000/s, of 20 Pa·s or more and 300 Pa·s or less. The melt viscosity is more suitably 30 Pa·s or more and 250 Pa·s or less, and still more suitably 40 Pa·s or more and 200 Pa·s or less. When the melt viscosity is 20 Pa·s or more, a good water pressure-resistant breaking strength can be obtained. Whereas, when the melt viscosity is 300 Pa·s or less, a good moldability can be obtained.

The PPS resin preferably has a melt flow rate (MFR), as measured under the conditions of a temperature of 315.5° C. and a load of 5,000 g, in accordance with ASTM D-1238-70, of 5 g/10 min or more and 2,000 g/10 min or less. When the MFR is 2,000 g/10 min or less, a good water pressure-resistant breaking strength can be obtained. Whereas, when the MFR is 5 g/10 min or more, a good moldability can be obtained.

The amount of volatile gas generated when the resin is heat melted under vacuum at 320° C. for two hours, is more preferably 0.3% by weight or less. When the amount of gas generated is within the above described preferred range, an increase in the amount of volatile components which adhere to a mold or a mold vent can be prevented, and transfer defects and gas burns are less likely to occur. The lower limit of the amount of gas generated is not particularly limited. However, it is economically disadvantageous, when a longer time is required for performing polymer washing and the thermal oxidation treatment, which are examples of means for reducing the amount of gas generated.

The "amount of gas generated" as described above refers to the amount of adhesive components, which are formed when the volatile gas generated upon heat melting the PPS resin under vacuum has been liquefied or solidified due to cooling, and is the amount measured by heating a glass ample into which the PPS resin has been vacuum sealed, in a tube furnace. The glass ample has a such a shape that the trunk portion thereof has a size of 100 mm×25 mm, the neck portion thereof has a size of 255 mm×12 mm, and the thickness thereof is 1 mm. Specifically, the measurement is carried out as follows. Only the trunk portion of the glass ample into which the PPS resin has been vacuum sealed is inserted into a tube furnace controlled to 320° C., and heated for two hours so that volatile gas is cooled at the neck portion of the ample which has not been heated by the tube furnace, and adheres to the neck portion. The neck portion is cut out and weighed, and the adhered gas is removed from the neck portion, by dissolving in chloroform. Subsequently, the neck portion is dried, and then weighed again. The amount of gas generated is determined from the difference in the weight of the neck portion of the ample before and after removal of the gas.

The PPS resin preferably has an ash content, when incinerated at 550° C., of less than 0.25% by weight. An ash content of 0.25% by weight or more indicates a high metal content in the PPS resin. When the ash content is within the above described preferred range, the PPS resin has a low metal content and an excellent electrical insulation, and a decrease in the melt flowability or the resistance to moist heat is less likely to occur. The ash content is more preferably 0.15% by weight or less, and most preferably 0.10% by weight or less.

The amount of residue, as measured when the PPS resin is dissolved in 1-chloronaphthalene in a weight 20 times the weight of the resin at 250° C. for 5 minutes, and subjected to hot filtration under pressure with a PTFE membrane filter having a pore size of 1 µm, is preferably 4.0% by weight or less. When the amount of residue is within the above described preferred range, the thermally oxidized crosslinking of the PPS resin is moderately inhibited, an increase in the amount of gelled product in the resin can be prevented, the toughness of the PPS resin is not decreased, and the water pressure resistance strength is also not decreased. The lower limit of the amount of residue is not particularly limited. However, the lower limit is preferably 1.5% or more, and more preferably 1.7% or more. When the lower limit of the amount of residue is within the above described preferred range, the degree of thermally oxidized crosslinking is prevented from being too low, generation of volatile components during melting is decreased, and the effect of reducing the amount of volatile components can be expected.

The "the amount of residue" as described above refers to a value measured using, as a sample, the PPS resin formed into a pressed film having a thickness of 80 µm, and using a hot filtration apparatus, and an SUS test tube equipped with an air pressure cap and a collecting funnel. Specifically, a membrane filter having a pore size of 1 µm is first set to the SUS test tube. Then the PPS resin which has been formed into a pressed film having a thickness of 80 µm, and 1-chloronaphthalene in a weight 20 times the weight of the PPS resin, are weighed into the test tube, followed by tightly sealing the test tube. The thus sealed test tube is set to a hot filtration apparatus controlled to 250° C., and heated for 5 minutes while shaking. Subsequently, a syringe containing air is connected to the air pressure cap, and the piston of the syringe is pressed to carry out hot filtration by air pressure. Specifically, the amount of residue is quantified from the difference between the weight of the membrane filter before the filtration, and the weight of the membrane filter which has been vacuum dried at 150° C. for 1 hour after the filtration.

When the total amount of the polyphenylene sulfide resin (A) and the aromatic vinyl compound block copolymer (B) containing a functional group is taken as 100 parts by weight, the blending amount of the polyphenylene sulfide resin (A) is required to be 99.5 to 51 parts by weight, preferably 98.5 to 70 parts by weight, and more preferably 95 to 85 parts by weight. When the blending amount of the polyphenylene sulfide resin (A) is less than 51 parts by weight, the heat resistance, chemical resistance and flame resistance are. Whereas, when the blending amount is more than 99.5 parts by weight, it results in poor toughness.

The aromatic vinyl compound block copolymer (B) containing at least one functional group selected from the group consisting of a carboxyl group, an acid anhydride group, a hydroxyl group, an amino group, an epoxy group and an isocyanate group, may be, for example, one obtained by modifying a block copolymer containing an aromatic vinyl unit, with a dicarboxylic acid group or a derivative group thereof such as maleic acid, fumaric acid, chloromaleic acid, itaconic acid, cis-4-cyclohexene-1,2-dicarboxylic acid or endo-cis-bicyclo(2,2,1)-5-heptene-2,3-dicarboxylic acid, or with an acid anhydride, an ester, an amide, an imide or the like of such a dicarboxylic acid. Among these, one containing an acid anhydride group of a dicarboxylic acid, or an amino group is preferred. Further, the aromatic vinyl compound block copolymer (B) is more preferably obtained by modifying a hydrogenated product of a styrene-butadiene-styrene block copolymer with an amino group or maleic anhydride. Specific examples thereof include commercially available products such as: Tuftec (registered trademark) (trade name) M-1913 (a maleic anhydride-modified product, manufactured by Asahi Kasei Corp.); Tuftec (registered trademark) (trade name) M-1943 (a maleic anhydride-modified product, manufactured by Asahi Kasei Corp.); and Tuftec (registered trademark) MP-10 (an amino group-modified product, manufactured by Asahi Kasei Corp.).

Among these, the most preferred example is a styrene-butadiene-styrene block copolymer modified with maleic anhydride, from the viewpoint of conforming to various standards for water applications.

The blending amount of the aromatic vinyl compound block copolymer (B), when the total amount of the polyphenylene sulfide resin (A) and the block copolymer (B) is taken as 100 parts by weight, is required to be 0.5 to 49 parts by weight, preferably 1.5 to 30 parts by weight, and more preferably 5 to 15 parts by weight. When the blending amount of the aromatic vinyl compound block copolymer (B) is less than 0.5 parts by weight, the impact strength is reduced. Whereas, when the blending amount is more than 49 parts by weight, a large amount of gas is generated during molding.

Examples of the alkoxysilane compound (C) containing at least one functional group selected from the group consisting of an epoxy group, an amino group and an isocyanate group include silane compounds, for example: isocyanate group-containing alkoxysilane compounds such as γ-isocyanatepropyltriethoxysilane, γ-isocyanatepropyltrimethoxysilane, γ-isocyanatepropylmethyldimethoxysilane, γ-isocyanatepropylmethyldiethoxysilane, γ-isocyanatepropylethyldimethoxysilane, γ-isocyanatepropylethyldiethoxysilane and γ-isocyanatepropyltrichlorosilane; epoxy group-containing alkoxysilane compounds such as γ-glycidoxypropyltrimethoxysilane, γ-glycidoxypropyltriethoxysilane, and β-(3,4-epoxycyclohexyl)ethyltrimethoxysilane; and amino group-containing alkoxysilane compounds such as γ-(2-aminoethyl)aminopropylmethyldimethoxysilane, γ-(2-aminoethyl)aminopropyltrimethoxysilane, and γ-aminopropyltrimethoxysilane. It is also possible to use a silane compound containing another functional group in combination, along with the alkoxysilane compound (C) containing at least one or more functional groups selected from the group consisting of an epoxy group, an amino group and an isocyanate group. The content of the alkoxysilane compound (C) is required to be 0.1 to 2.0 parts by weight, more preferably 0.15 to 1.5 parts by weight, and still more preferably 0.2 to 1.0 parts by weight, with respect to 100 parts by weight of the total amount of the polyphenylene sulfide resin (A) and the aromatic vinyl compound block copolymer (B). When the content of the alkoxysilane compound (C) is less than 0.1 parts by weight, the average dispersion diameter of the aromatic vinyl compound block copolymer exceeds 1,000 nm, and the impact resistance strength and the water pressure-resistant breaking strength are decreased. When the content is more than 2.0 parts by weight, the flowability is decreased, resulting in a marked decrease in the moldability. Among the alkoxysilane compounds, a compound containing an epoxy group and/or an amino group is preferred, and aminosilane is most suitably used, because of its low toxicity.

The resin composition contains a reaction product produced by the reaction between the components included in the composition. Since the reaction product is produced by a complicated reaction between the polymers, there is a reason that it is impractical to specify the structure thereof. Accordingly, the resin composition is specified by the amounts of the components included.

Further, the PPS resin composition may contain an organic nucleating agent as long as the desired effect is not impaired. Examples of the organic nucleating agent include: sorbitol compounds and metal salts thereof; metal salts of phosphoric acid esters; rosin compounds; amide compounds such as oleic acid amide, acrylic acid amide, stearic acid amide, decanedicarboxylic acid dibenzoylhydrazide, hexanedicarboxylic acid dibenzoylhydrazide, 1,4-cyclohexanedicarboxylic acid dicyclohexylamide, trimesic acid amide, anilide compounds, 2,6-naphthalenedicarboxylic acid dicyclohexylamide, N,N'-dibenzoyl-1,4-diaminocyclohexane, N,N'-dicyclohexanecarbonyl-1,5-diaminonaphthalene, and octanedicarboxylic acid dibenzoylhydrazide; and organic compounds and polymer compounds such as ethylenediamine-stearic acid-sebacic acid polycondensates, montanic acid waxes, metal salts of aliphatic metal carboxylic acids, metal salts of aromatic carboxylic acids, aromatic phosphonic acids and metal salts thereof, metal salts of aromatic phosphoric acids, metal salts of aromatic sulfonic acids, metal salts of β-diketones, metal salts of carboxyl groups, organic phosphorus compounds, polyethylene, polypropylene, polybutadiene, polystyrene, AS resins, ABS resins, poly(acrylic acid), poly(acrylic acid ester), poly(methacrylic acid), poly(methacrylate), polyamide 6, polyamide 46, polyamide 66, polyamide 6T, polyamide 9T, polyamide 10T, polyether ether ketone and polyether ketone.

In addition, another resin may further be blended into the PPS resin composition as long as the desired effect is not impaired. Specific examples of such a resin which can be blended into the PPS resin composition include, but not particularly limited to: polyamide, polyester resins such as polyethylene terephthalate, polybutylene terephthalate, polycyclohexyl dimethylene terephthalate and polynaphthalene terephthalate; polyethylene, polypropylene, polytetrafluoroethylene, polyolefin elastomers, polyether ester elastomers, polyether amide elastomers, polyamideimides, polyacetals, polyimides, polyetherimides, polyether sulfones, polysulfone resins, polyallyl sulfone resins, polyketone resins, polyarylate resins, liquid crystal polymers, polyether ketone resins, polythioether ketone resins, polyether ether ketone resins, polyamideimide resins, tetrafluorinated polyethylene resins and epoxy group-containing polyolefin copolymers.

The PPS resin composition may contain other components, as long as the desired effect is not impaired. Examples thereof include common additives other than those mentioned above, for example: antioxidants and heat stabilizers (hydroquinone-based agents); weather resistant agents (such as resorcinol-based, salicylate-based, benzotriazole-based, benzophenone-based and hindered amine-based agents); mold release agents and lubricants (such as montanic acid, metal salts thereof, esters thereof and half esters thereof, stearyl alcohol, stearamide, bisurea, and polyethylene waxes); pigments (such as cadmium sulfide, phthalocyanine, and carbon blacks for coloring); dyes (such as phthalocyanine and nigrosine), plasticizers (such as octyl p-oxybenzoate and N-butylbenzene sulfonamide); antistatic agents (such as alkyl sulfate-type anionic antistatic agents, quaternary ammonium salt-type cationic antistatic agents, nonionic antistatic agents such as polyoxyethylene sorbitan monostearate, and betaine-based amphoteric antistatic agents); flame retardants (for example, red phosphorus, phosphoric acid ester, melamine cyanurate, hydroxides such as magnesium hydroxide and aluminum hydroxide, ammonium polyphosphate, brominated polystyrene, brominated polyphenylene ether, brominated polycarbonate, brominated epoxy resins, and combinations of these bromine-based flame retardants with antimony trioxide); thermal stabilizers; lubricants such as calcium stearate, stearic acid aluminum and lithium stearate; strength enhancing materials such as bisphenol epoxy resins including bisphenol A type epoxy resins, novolac phenol type epoxy resins and cresol novolac type epoxy resins; UV inhibitors; colorants; flame retardants; and foaming agents.

The PPS resin composition has an excellent impact resistance and water pressure-resistant breaking strength. To obtain such properties, it is necessary that, in the morphology of the PPS resin composition observed by an electron microscope, the PPS resin (A) forms a continuous phase (sea phase or matrix), and the aromatic vinyl compound block copolymer (B) forms a dispersed phase (island phase or domain). The dispersed phase composed of the aromatic vinyl compound block copolymer (B) is required to have a number average dispersed particle size of 1,000 nm or less, preferably 500 nm or less, more preferably 400 nm or less, still more preferably 300 nm or less, and most preferably 200 nm or less. When the number average dispersed particle size of the dispersed phase is more than 1,000 nm, it causes a decrease in the impact resistance strength and the water pressure-resistant breaking strength. Although the lower limit value of the number average dispersed particle size is the lower, the more preferred, from the viewpoint of improving the impact resistance strength and the water pressure-resistant breaking strength, the lower limit value thereof is preferably 50 nm or more.

It is preferred that the PPS resin composition has a good flowability, and that a molded article of the composition has fewer flashes. More specifically, the PPS resin composition preferably has a non-Newtonian index of 1.50 or more, more preferably 1.55 or more, still more preferably 1.58 or more, and most preferably 1.60 or more. The reaction between the PPS resin (A) and the aromatic vinyl compound block copolymer (B) in the resin composition causes an increase in the non-Newtonian index. When the non-Newtonian index is adjusted to 1.5 or more, the reaction is allowed to proceed sufficiently, leading to a further improvement in the impact resistance strength and the water pressure-resistant breaking strength. The non-Newtonian index is preferably adjusted to 1.5 or more, also from the viewpoint of improving the impact resistance strength and the water pressure-resistant breaking strength. Although the upper limit value of the non-Newtonian index is the higher, the more preferred, from the viewpoint of improving the impact resistance strength and the water pressure-resistant breaking strength, the upper limit value thereof is preferably 2.5.

The "non-Newtonian index" as used herein refers to the value of N calculated based on the shear stress and the shear rate of the PPS resin composition measured using a Capillograph 1B (with a capillary having an orifice length of 40 mm and an orifice diameter of 1 mm; manufactured by Toyo Seiki Co., Ltd.) under the conditions of a temperature of 320° C., in accordance with the following equation (1). (In the equation (1), N represents the non-Newtonian index; SR represents the shear rate (1/sec); SS represents the shear stress (dyne/cm$^2$); and K represents a constant.) When the value of N is 1, it indicates that the resin composition is a Newtonian fluid, and whereas when the value of N is more than 1, it indicates that the resin composition is a non-Newtonian fluid. A higher value of N means that the shear rate dependence of the melt viscosity is more improved, based on the progress of the reaction between the polymers.

$$SR = K \cdot SS^N \tag{1}$$

The method of producing the PPS resin composition is not particularly limited. Representative examples include a method in which respective raw materials are mixed, and fed into a commonly known melt blender such as a single screw or twin screw extruder, a Banbury mixer, a kneader or a mixing roll, followed by kneading.

In particular, a suitable method is one in which melt-kneading is carried out using a twin screw extruder having a ratio L/D of screw length L to screw diameter D of 10 or more and 100 or less. The ratio L/D is more suitably 20 or more and 100 or less, and still more suitably 30 or more and 100 or less.

At the time of producing the PPS resin composition, the melt-kneading using the twin screw extruder is preferably carried out at a screw rotation speed of 300 rpm or more, more preferably 350 rpm or more, and still more preferably 400 rpm or more. By adjusting the screw rotation speed to a relatively higher level, as described above, the fine dispersion of the aromatic vinyl compound block copolymer (B) containing a functional group is facilitated, thereby obtaining an excellent elongation and impact strength. The upper limit of the screw rotation speed is not particularly limited. However, the upper limit is preferably 600 rpm or less, from the viewpoint of inhibiting the decomposition of the polymer associated with an excessive increase in the resin temperature.

At the time of producing the PPS resin composition, the melt-kneading using the twin screw extruder is carried out at a melt-kneading energy of 0.15 kWh/kg or more and 0.5 kWh/kg or less. The melt-kneading energy is preferably 0.20 kWh/kg or more, and more preferably 0.25 kWh/kg or more. The upper limit of the melt-kneading energy is more preferably 0.45 kWh/kg or less and still more suitably 0.40 kWh/kg or less. When the melt-kneading energy is within the above described preferred range, the melt-kneading can be performed sufficiently, the number average dispersed particle size of the aromatic vinyl compound block copolymer does not exceed 1,000 nm, and an excellent impact resistance strength and water pressure-resistant breaking strength are more likely to be obtained. At the same time, the resin temperature can be controlled easily, an undesired decomposition reaction can be avoided, and a decrease in the impact resistance strength and the water pressure-resistant breaking strength can be prevented.

The "melt-kneading energy" as used herein refers to a value of the workload performed by the extruder on the raw materials, expressed per unit extrusion mass. The melt-kneading energy can be represented by equation (2), when A is defined as the screw rotation speed (rpm) of the twin screw extruder during the melt-kneading, B is defined as the maximum screw rotation speed (rpm) of the twin screw extruder, and C is defined as the output (kW) of a screw drive motor during the melt-kneading, and F is defined as the discharge amount (kg/h) of a molten resin during the melt-kneading.

$$E = \{(A/B) \times C\}/F \tag{2}$$

The PPS resin composition is melt-kneaded using the twin screw extruder, continuously discharged from the die exit of the extruder, and recovered. To carry out this process, it is preferred to use, for example, a method in which the resin temperature (hereinafter, also referred to as the "resin temperature at the die exit") is controlled to 400° C. or lower.

The "resin temperature at the die exit" is the temperature of a resin gut discharged from the die exit, measured within the region 1 cm from the die exit, by directly pressing a thermocouple onto the resin gut. The resin temperature at the die exit is preferably 380° C. or lower, more preferably 360° C. or lower, and most preferably 350° C. or lower. When the resin temperature at the die exit is within the above described preferred range, the decomposition of the aromatic vinyl compound block copolymer can be prevented, and an excellent impact resistance strength and water pressure-resistant breaking strength are more likely to be obtained. The method of controlling the resin temperature at the die exit to 400° C. or lower is not particularly limited. However, a method of adjusting the cylinder temperature can be carried out easily, and is thus suitable. To decrease the resin temperature lower than the actual temperature and control the resin temperature to 400° C. or lower, a method of decreasing the cylinder temperature can be used, for example. However, an excessive decrease in the cylinder temperature may cause an increase in shear heating, possibly resulting in an increase in the resin temperature, instead. As a more preferred method of decreasing the resin temperature, it is preferred to use, for example, a method in which the cylinder temperature in the zone including the screw for transporting the resin is adjusted lower than the temperature in the kneading zone. On the other hand, to increase the resin temperature higher than the actual temperature and control the resin temperature to 400° C. or lower, a method of increasing the cylinder temperature can be used, for example. However, an excessive increase in the cylinder temperature may cause a decrease in the shear heating, possibly resulting in a decrease in the resin temperature, instead. As a more preferred method of increasing the resin temperature, it is preferred to use, for example, a method in which the cylinder temperature in the zone including the screw for transporting the resin is adjusted lower than the temperature in the kneading zone. The lower limit of the resin temperature at the die exit of the twin screw extruder is more preferably 300° C. or higher, and still more preferably 330° C. or higher.

At the time of producing the PPS resin composition by melt-kneading, the order of mixing the raw materials is not particularly limited, and mixing can be carried out using any of the following methods: a method in which all the raw materials are mixed and then fed from the main feed port by the above described method, followed by melt-kneading; a method in which some of the raw materials are mixed, the resulting mixture is melt-kneaded by the above described method, and the remaining raw materials are further mixed, followed by melt-kneading; a method in which some of the raw materials are mixed, and then, during the melt-kneading of the resulting mixture using a single screw extruder or a twin screw extruder, the remaining raw materials are fed from the side feeder and mixed; and the like. Further, it is of course possible to add additive components to be added in small amounts, after kneading other components by the above described method or the like and forming into pellets, and before molding, followed by subjecting the resulting mixture to molding. From the viewpoint of inhibiting the thermal decomposition of the aromatic vinyl compound block copolymer (B), and reducing the average dispersed particle size, a method is preferred in which the aromatic vinyl compound block copolymer (B) is fed from the side feed port provided on the downstream side of the main feed port in the extrusion direction, followed by melt-kneading. It is preferred that the amount of the aromatic vinyl compound block copolymer to be fed from the side feed port be equal to or more than half the amount of the total blending amount of the block copolymer, more preferably 70% or more of the total blending amount, and still more preferably 80% or more of the total blending amount. The upper limit of the amount of the aromatic vinyl compound block copolymer to be fed from the side feed port is preferably 100% or less, and more preferably 98% or less of the total blending amount. By controlling the blending amounts to be fed from the main feed port and the side feed port, as described above, the balance between the tensile elongation and the impact strength of the non-welded portion and the welded portion of the PPS resin composition will be improved.

The PPS resin composition preferably has a water pressure resistance strength, as measured using a test piece formed into a T-shaped pipe fitting having an outer diameter of 21.7 mm and a thickness of 2.8 mm, of 9 MPa or more. The water pressure resistance strength is more suitably 10 MPa or more, and still more suitably 11 MPa or more. A water pressure resistance strength of 9 MPa or more is preferred, since it leads to an improvement in durability, thereby enabling the use in a hot water environment. The above described T-shaped pipe fitting is obtained by: feeding the pellets of the PPS resin composition into an injection molding machine (SE100DU), manufactured by Sumitomo Heavy Industries, Ltd., which has been set to a cylinder temperature of 305° C. and a mold temperature of 130° C.; performing filling for a filling time of 1 s; performing injection molding with a holding pressure corresponding to 50% of the filling pressure. In this manner, a test piece of a T-shaped pipe fitting as defined in JIS G 3452, which has an outer diameter of 21.7 mm and a thickness of 2.8 mm, is obtained. The water pressure resistance strength is determined as follows. A rubber pipe connected to a pump (T-300N) manufactured by Kyowa Co., Ltd. is connected to one end of the test piece, and a sealing plug and a ball valve are connected to the remaining two ends of the test piece. Thereafter, water is allowed to pass through the test piece, in a state where the ball valve is opened, and the ball valve is closed after removing air in the test piece. Subsequently, a water pressure is applied using the pump, and the pressure indicated by a pressure meter when the test piece breaks is defined as the water pressure resistance strength.

The PPS resin composition obtained as described above can be used in various types of molding processes such as injection molding, extrusion molding, blow molding and transfer molding. However, the PPS resin composition is particularly suitable for use in injection molding applications.

Since the PPS resin composition has an excellent water pressure-resistant breaking strength and resistance to moist heat, the resin composition can be used in pipe components used at locations where a high temperature liquid flows, and where a high water pressure comparable to the direct pressure of water supply system or a high water pressure due to water hammer is applied. The pipe components refer to any of fittings, valves, servos, sensors, pipes and pumps, and the PPS resin composition is particularly preferably used in water heater components. In a conventional reduced pressure-type water heater, a high water pressure is not applied to the pipe components which come into contact with high temperature water, and thus, pipe components composed of conventional PPS resin compositions could be used. However, in such a reduced pressure-type water heater, there has been a problem that the water pressure is decreased when hot water is discharged from a plurality of faucets at the same time. In contrast, in a direct water pressure-type water heater (connected directly to water supply system, without pressure control) in which nonuniformity in hot water pressure and hot water temperature have been improved, a high temperature liquid comes into contact with the pipe components at a high water pressure, and thus it has been unable to use pipe components composed of conventional PPS resin compositions. A pipe component composed of the PPS resin composition can be used, for example, as a pipe component of a direct water pressure-type water heater that contacts a liquid having a temperature of 70° C. or higher at a pressure of 0.3 MPa or more. The PPS resin composition can also be used in a pipe component in the form of a screw, due to an improvement in tightening torque strength.

The liquid which flows through the pipe component may be not only water, but also an anti-freezing solution, including an alcohol, a glycol, glycerin and the like, and the type and the concentration thereof are not particularly limited.

Further, the PPS resin composition can also be used in: pipe components such as water supply faucet components, casing components for liquid pumps and combination faucets, to which a low water pressure is applied; and water application components such as water meter components, to which a high water pressure is applied, but which do not come in contact with a high temperature water flow.

As described above, a pipe component composed of the PPS resin composition has an excellent water pressure-resistant breaking strength and resistance to moist heat, and thus can be used at locations where a high temperature water flows, and where a high water pressure comparable to the direct pressure of water supply system is applied.

Examples of applications in which a molded article composed of the PPS resin composition can be used, in addition to those described above, include: electric and electronic components represented by sensors, LED lamps, connectors for consumer use, sockets, resistors, relay case switches, coil bobbins, condensers, casings for variable condensers, oscillators, various types of terminal boards, transformers, plugs, printed circuit boards, tuners, speakers, microphones, headphones, small motors, magnetic head bases, semiconductors, liquid crystals, FDD carriages, FDD chassis, motor brush holders, parabolic antennas, computer-related components and the like; and components for home appliances and electrical office products represented by VTR components, television components, irons components, hair dryers components, rice cooker components, microwave oven components, acoustic components, audio equipment components such as those for audio laser disks (registered trademarks) and compact disks, components for lighting equipment, refrigerator components, air conditioner components, typewriter parts, word processor parts and the like. Other examples of applications include: machine-related components represented by office computer components, telephone-related parts, facsimile machine-related parts, copying machine-related parts, cleaning tools, motor parts, lighters, typewriters and the like; parts for optical devices and precision machinery represented by microscopes, binoculars, cameras, clocks and the like; automotive and vehicular components such as valve alternator terminals, alternator connectors, IC regulators, potentiometer bases for light deer, various valves such as exhaust gas valves, various pipes such as fuel-related pipes and exhaust- and air intake-related pipes, air intake nozzle snorkels, intake manifolds, fuel pumps, engine coolant joints, carburetor main bodies, carburetor spacers, exhaust gas sensors, coolant sensors, oil temperature sensors, throttle position sensors, crankshaft position sensors, air flow meters, brake pad wear sensors, thermostat bases for air conditioners, air flow control valves for heaters, brush holders for radiator motors, water pump impellers, turbine vanes, wiper motor-related components, distributors, starter switches, starter relays, wire harnesses for transmissions, window washer nozzles, substrates for air conditioner panel switches, fuel system-related solenoid valve coils, fuse connectors, horn terminals, insulating plates for electrical equipment, step motor rotors, lamp sockets, lamp reflectors, lamp housings, brake pistons, solenoid bobbins, engine oil filters, ignition device cases, vehicle speed sensors and cable liners; consumer electronics; food contact products such as table wares, chopsticks and food storage containers.

EXAMPLES

Our compositions, molded articles and methods will now be described more specifically, with reference to Examples shown below. It is noted, however, that this disclosure is in no way limited to these Examples.

(A) PPS Resins

Reference Example 1 Preparation of PPS-1

Into a 70 L autoclave equipped with a stirrer, 8,267.37 g (70.00 mol) of a 47.5% sodium hydrosulfide, 2,957.21 g (70.97 mol) of a 96% sodium hydroxide, 11,434.50 g (115.50 mol) of N-methyl-2-pyrrolidone (hereinafter, referred to as "NMP"), 2,583.00 g (31.50 mol) of sodium acetate, and 10,500 g of ion exchanged water were charged. The resultant was gradually heated to 245° C. for over about 3 hours at normal pressure, while introducing nitrogen. After removing 14,780.1 g of water and 280 g of NMP by distillation, the reaction vessel was cooled to 160° C. The amount of remaining water in the system per 1 mol of the charged alkali metal sulfide was 1.06 mol, including the amount of water consumed by the hydrolysis of NMP. The amount of hydrogen sulfide evaporated and scattered was 0.02 mol per 1 mol of the charged alkali metal sulfide. Subsequently, 10,235.46 g (69.63 mol) of p-dichlorobenzene and 9,009.00 g (91.00 mol) of NMP were added. The reaction vessel was then tightly sealed under nitrogen gas, and heated to 238° C. at a rate of 0.6° C./min, while stirring at 240 rpm. After allowing the reaction to proceed at 238° C. for 95 minutes, the reaction vessel was heated to 270° C. at a rate of 0.8° C./min. Further, after allowing the reaction to proceed at 270° C. for 100 minutes, the reaction vessel was cooled to 250° C. at a rate of 1.3° C./min, while injecting 1,260 g (70 mol) of water over 15 minutes. Thereafter, the reaction vessel was cooled to 200° C. at a rate of 1.0° C./min, and then rapidly cooled to near room temperature. The content of the vessel was taken out, diluted with 26,300 g of NMP, and the solvent and solids were separated by filtration using a sieve (80 mesh). The thus obtained particles were washed with 31,900 g of NMP, and filtered. The resulting particles were washed several times with 56,000 g of ion exchanged water and filtered, and then washed with 70,000 g of an aqueous solution of 0.05% by weight acetic acid and filtered. Subsequently, the particles were further washed with 70,000 g of ion exchanged water and filtered, and then the resulting water-containing PPS particles were dried with hot air at 80° C., followed by drying under reduced pressure at 120° C. The thus obtained PPS resin had an MFR of 100 g/10 min. The "melt flow rate" (MFR) as used herein refers to a value measured using a melt indexer (with an orifice having a length of 8.00 mm and a hole diameter of 2.095 mm), manufactured by Toyo Seiki Co., Ltd., under the conditions of a temperature of 315.5° C. and a load of 5,000 g, and in accordance with ASTM D-1238-70.

Reference Example 2 Preparation of PPS-2

Into a 70 L autoclave equipped with a stirrer, 8.27 kg (70.00 mol) of a 47.5% sodium hydrosulfide, 2.96 kg (70.97 mol) of a 96% sodium hydroxide, 11.43 kg (115.50 mol) of NMP, 2.58 kg (31.50 mol) of sodium acetate, and 10.50 kg of ion exchanged water were charged. The resultant was gradually heated to 245° C. for over about 3 hours at normal pressure, while introducing nitrogen. After removing 14.78 kg of water and 0.28 kg of NMP by distillation, the reaction vessel was cooled to 160° C. The amount of remaining water in the system per 1 mol of the charged alkali metal sulfide was 1.06 mol, including the amount of water consumed by the hydrolysis of NMP. The amount of hydrogen sulfide evaporated and scattered was 0.02 mol per 1 mol of the charged alkali metal sulfide.

Subsequently, 10.24 kg (69.63 mol) of p-dichlorobenzene and 9.01 kg (91.00 mol) of NMP were added. The reaction vessel was then tightly sealed under nitrogen gas, and heated to 238° C. at a rate of 0.6° C./min, while stirring at 240 rpm. After allowing the reaction to proceed at 238° C. for 95 minutes, the reaction vessel was heated to 270° C. at a rate of 0.8° C./min. Further, after allowing the reaction to proceed at 270° C. for 100 minutes, the reaction vessel was cooled to 250° C. at a rate of 1.3° C./min, while injecting 1,260 g (70 mol) of water over 15 minutes. Thereafter, the reaction vessel was cooled to 200° C. at a rate of 1.0° C./min, and then rapidly cooled to near room temperature.

The content of the vessel was taken out, diluted with 2.63 kg of NMP, and the solvent and solids were separated by filtration using a sieve (80 mesh). The thus obtained particles were washed with 31.90 kg of NMP, and filtered. The resulting particles were washed several times with 56.00 kg of ion exchanged water and filtered, and then washed with 70,000 g of an aqueous solution of 0.05% by weight acetic acid and filtered. Subsequently, the particles were further washed with 70.00 kg of ion exchanged water and filtered, and then the resulting water-containing PPS particles were dried with hot air at 80° C., followed by drying under reduced pressure at 120° C. The thus obtained PPS resin had an MFR of 600 g/10 min. The "melt flow rate" (MFR) as used herein refers to a value measured using a melt indexer (with an orifice having a length of 8.00 mm and a hole diameter of 2.095 mm), manufactured by Toyo Seiki Co., Ltd., under the conditions of a temperature of 315.5° C. and a load of 5,000 g, and in accordance with ASTM D-1238-70.
(B) Aromatic Vinyl Compound Block Copolymers B-1: a hydrogenated product of a styrene-butadiene copolymer (Tuftec™ M-1943: a maleic anhydride-modified product; manufactured by Asahi Kasei Corp.)

B-2: a hydrogenated product of a styrene-butadiene copolymer (Tuftec™ MP-10: an amino group-modified product; manufactured by Asahi Kasei Corp.)
(C) Alkoxysilane Compounds C-1: 3-aminopropyltriethoxysilane (KBE-903; manufactured by Shin-Etsu Chemical Co., Ltd.)

C-2: 3-glycidyloxypropyltrimethoxysilane (SH6040; manufactured by DuPont Toray Specialty Materials K.K.)

C-3: 2-(3,4-epoxycyclohexyl)ethyltrimethoxysilane (KBM-303; manufactured by Shin-Etsu Chemical Co., Ltd.)
Measurement and Evaluation Methods The measurement and evaluation methods used in each of the Examples and Comparative Examples are as follows.

Measurement of Number Average Dispersed Particle Size

The pellets of the PPS resin composition were fed into an injection molding machine (SE50 DUZ-C160) manufactured by Sumitomo Heavy Industries, Ltd., which had been set to a cylinder temperature of 310° C. and a mold temperature of 145° C., and filled for a filling time of 0.8 s. Injection molding was then carried out with a holding pressure corresponding to 75% of the filling pressure, to obtain a Type A1 test piece defined in ISO 20753. The test piece was cut out in the central portion thereof, and a thin slice having a thickness of 0.1 μm or less was cut out at −20° C. An image of the resulting slice was captured using a transmission electron microscope, H-7100 (resolution (particle image): 0.38 nm, magnification: 500,000 to 600,000-fold) manufactured by Hitachi, Ltd., at a magnification of 10,000-fold. Subsequently, the maximum diameter and the minimum diameter of each of the dispersed particle portions of the aromatic vinyl compound block copolymer (B), dispersed in the PPS resin (A), were measured first, and the mean value thereof was determined to be taken as the dispersed particle size of each particle portion. Thereafter, the mean value of the dispersed particle sizes of the particle portions was determined as the number average dispersed particle size.

Measurement of Non-Newtonian Index

The shear stress and the shear rate of the pellets of the PPS resin composition were measured using a Capillograph 1B (with a capillary having a length of 40 mm and a diameter of 1 mm, orifice L/D=40), manufactured by Toyo Seiki Co., Ltd., under the conditions of a temperature of 320° C., and the non-Newtonian index N was determined in accordance with the following equation (1). In equation (1), N represents the non-Newtonian index; SR represents the shear rate (1/sec); SS represents the shear stress (dyne/cm$^2$); and K represents a constant).

$$SR = K \cdot SS^N \quad (1)$$

Measurement of Impact Resistance Strength

The pellets of the PPS resin composition were fed into an injection molding machine (SE50 DUZ-C160) manufactured by Sumitomo Heavy Industries, Ltd. that had been set to a cylinder temperature of 310° C. and a mold temperature of 145° C., and filled for a filling time of 0.8 s. Injection molding was then carried out with a holding pressure corresponding to 75% of the filling pressure, to obtain a Type A1 test piece defined in ISO 20753. The central portion of the resulting test piece was cut out in a thickness of 80 mm, and a V notch was provided thereto, to prepare a test piece (having a width of 4.0 m, with a notch) for measurement. Thereafter, the measurement was carried out under the conditions of a temperature of 23° C., in accordance with ISO 179.

Measurement of Water Pressure Resistance Strength

The pellets of the PPS resin composition were fed into an injection molding machine (SE100 DU) manufactured by Sumitomo Heavy Industries, Ltd. that had been set to a cylinder temperature of 305° C. and a mold temperature of 130° C., and filled for a filling time of 1 s. Injection molding was then carried out with a holding pressure corresponding to 50% of the filling pressure, to obtain a test piece of a T-shaped pipe fitting having an outer diameter of 21.7 mm and a thickness of 2.8 mm. A rubber pipe connected to a pump (T-300N) manufactured by Kyowa Co., Ltd. was connected to one end of the test piece, and a sealing plug and a ball valve were connected to the remaining two ends of the test piece. Thereafter, water was allowed to pass through the test piece, in a state where the ball valve was opened, and the ball valve was closed after removing air in the test piece.

Subsequently, a water pressure was applied using the pump, and the pressure indicated by a pressure meter when the test piece broke was defined as the water pressure resistance strength.

Measurement of Tensile Strength and Tensile Elongation

The pellets of the PPS resin composition were fed into an injection molding machine (SE50 DUZ-C160) manufactured by Sumitomo Heavy Industries, Ltd. that had been set to a cylinder temperature of 310° C. and a mold temperature of 145° C., and filled for a filling time of 0.8 s. Injection molding was then carried out with a holding pressure corresponding to 75% of the filling pressure, to obtain a Type A1 test piece defined in ISO 20753. A tensile test was carried out using the thus obtained test piece, with a distance between chucks of 115 m and a strain rate of 5 mm/min. The measured breaking strength was determined as the tensile strength of the non-welded portion, and the measured breaking strain was determined as the tensile elongation of the non-welded portion. The plastic deformation starts when the above described tensile elongation exceeds 10%, and a ductile fracture form accompanied by necking is observed when the tensile elongation exceeds 15%. Thus, the tensile elongation can be used as an index for evaluating a high level of toughness.

Measurement of Weld Tensile Strength and Weld Tensile Elongation

The pellets of the PPS resin composition were fed into an injection molding machine (SE50 DUZ-C160) manufactured by Sumitomo Heavy Industries, Ltd. that had been set to a cylinder temperature of 320° C. and a mold temperature of 135° C. The resin composition was injected from both ends of an ASTM No. 4 dumbbell piece having a gate on each of both ends thereof, to obtain a test piece having a welded portion in the central portion of the piece. A tensile test was carried out using the thus obtained test piece, with a distance between chucks of 65 mm and a strain rate of 10 mm/min. The measured breaking strength was determined as the weld tensile strength, and the measured breaking strain was determined as the weld tensile elongation. The plastic deformation starts when the above described tensile elongation exceeds 10%, and a ductile fracture form accompanied by necking is observed when the tensile elongation exceeds 15%. Thus, the tensile elongation can be used as an index for evaluating a high level of toughness.

Appearance after Treating at 240° C. for 500 Hours

The pellets of the PPS resin composition were subjected to injection molding under the same conditions for the test piece for measuring the tensile strength and the tensile elongation to obtain a Type A1 test piece defined in ISO 20753. The thus obtained test piece was subjected to a heat treatment in the atmosphere at 240° C. for 500 hours, using a thermostat (PHH-202, manufactured by ESPEC CORP.). Thereafter, the appearance of the test piece was observed, to confirm the presence or absence of cracks on the surface of the test piece.

Possibility for Acquiring FDA Approval

The raw materials to be used for the PPS resin composition were checked by comparison with items on the lists of polymers and additives defined in the Code of Federal Regulations, Title 21, sections 177 and 178. When the raw materials were included in the items on the lists, it was determined that the PPS resin composition was capable of acquiring FDA approval, and when substances not on the list were included in the raw materials, it was determined that the PPS resin composition was not capable of acquiring FDA approval.

Production of PPS Resin Composition

In each of the Examples and Comparative Examples, the PPS resin (A), the aromatic vinyl compound block copolymer (B) and the alkoxysilane compound (C) were fed into a twin screw extruder (TEM-26SS, L/D=64.6, manufactured by Toshiba Machine Co., Ltd.) equipped with an intermediate addition port having a diameter of 26 mm and set to a cylinder temperature of 280° C., in the weight ratios shown in Tables 1 and 2. The PPS resin (A) and the alkoxysilane compound (C) were fed from the main feed port, and the aromatic vinyl compound block copolymer (B) was fed from the main feed port and/or the side feed port provided on the downstream side of the main feed port in the extrusion direction. Thereafter, the resultant was melt-kneaded to obtain pellets. The above described properties were evaluated, using the thus obtained pellets. The results are shown in Tables 1 and 2.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (A) component | PPS-1 | 90 | 90 | 90 | 90 | 90 | 90 | 90 | 90 | 90 | 90 |
| | PPS-2 | | | | | | | | | | |
| (B) component | (B-1) M-1943 | 10 | 10 | 10 | 10 | 10 | 10 | 10 | 10 | 10 | |
| | (B-2) MP-10 | | | | | | | | | | 10 |
| (C) component | (C-1) KBE-903 | 0.5 | 0.5 | 0.5 | 0.5 | 0.5 | | | 0.5 | 0.5 | 0.5 |
| | (C-2) SH6040 | | | | | | 0.5 | | | | |
| | (C-3) KBM-303 | | | | | | | 0.5 | | | |
| Supplied amount of (B) component at Main Feed Port (wt %) | | 100 | 50 | 20 | 10 | 0 | 0 | 0 | 0 | 0 | 0 |
| Supplied amount of (B) component at Side Feed Port (wt %) | | 0 | 50 | 80 | 90 | 100 | 100 | 100 | 100 | 100 | 100 |
| Number average dispersed particle size (nm) | | 700 | 500 | 300 | 250 | 200 | 400 | 350 | 600 | 700 | 350 |
| Non-Newtonian index | | 1.50 | 1.55 | 1.58 | 1.59 | 1.60 | 1.55 | 1.55 | 1.45 | 1.50 | 1.55 |
| Screw rotation speed (rpm) | | 400 | 400 | 400 | 400 | 400 | 400 | 400 | 300 | 400 | 400 |
| Melt kneading energy E (kWh/kg) | | 0.25 | 0.25 | 0.25 | 0.25 | 0.25 | 0.25 | 0.25 | 0.15 | 0.55 | 0.25 |
| (B) component Feed Port location of biaxial extruder | | Main | Main, Side | Main, Side | Main, Side | Side | Side | Side | Side | Side | Side |
| Resin temperature at die outlet (° C.) | | 360 | 350 | 350 | 350 | 350 | 360 | 350 | 330 | 410 | 350 |
| Charpy impact strength (notched) (kJ/m$^2$) | | 20 | 25 | 36 | 38 | 40 | 30 | 35 | 15 | 15 | 35 |
| Water presssure resistant strength (MPa) | | 17 | 18 | 19 | 19 | 19 | 18 | 18 | 12 | 14 | 18 |
| Tensile strength (MPa) | | 60 | 60 | 63 | 64 | 65 | 65 | 65 | 63 | 64 | 65 |
| Tensile elongation (%) | | 20 | 18 | 18 | 18 | 15 | 14 | 15 | 12 | 13 | 14 |
| Weld tensile strength (MPa) | | 50 | 55 | 58 | 59 | 60 | 60 | 60 | 55 | 55 | 60 |
| Weld tensile elongation (%) | | 10 | 14 | 20 | 20 | 20 | 18 | 19 | 15 | 15 | 19 |

TABLE 1-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Appearance of Molded article after 240° C., 500 hr treatment | cracked | cracked | uncracked | uncracked | uncracked | uncracked | uncracked | uncracked | uncracked | uncracked |
| FDA authentication | acquirable | acquirable | acquirable | acquirable | acquirable | unacquirable | unacquirable | acquirable | acquirable | acquirable |

TABLE 2

|  |  | Example 11 | Example 12 | Example 13 | Comparative Example 1 | Comparative Example 2 | Comparative Example 3 | Comparative Example 4 | Comparative Example 5 |
|---|---|---|---|---|---|---|---|---|---|
| (A) component | PPS-1 | 90 |  |  | 90 | 90 | 90 | 90 | 90 |
|  | PPS-2 |  | 90 | 90 |  |  |  |  |  |
| (B) component | (B-1) M-1943 |  |  |  | 10 | 10 |  | 10 | 10 |
|  | (B-2) MP-10 | 10 | 10 | 10 |  |  | 10 |  |  |
| (C) component | (C-1) KBE-903 |  |  |  |  |  |  | 0.5 | 0.5 |
|  | (C-2) SH6040 |  |  |  |  |  |  |  |  |
|  | (C-3) KBM-303 | 0.5 | 0.5 | 0.5 |  |  |  |  |  |
| Supplied amount of (B) component at Main Feed Port (wt %) |  | 0 | 0 | 100 | 100 | 0 | 100 | 0 | 0 |
| Supplied amount of (B) component at Side Feed Port (wt %) |  | 100 | 100 | 0 | 0 | 100 | 0 | 100 | 100 |
| Number average dispersed particle size (nm) |  | 400 | 400 | 450 | 7500 | 10000 | 6000 | 1500 | 1200 |
| Non-Newtonian index |  | 1.55 | 1.60 | 1.50 | 1.35 | 1.35 | 1.30 | 1.40 | 1.40 |
| Screw rotation speed (rpm) |  | 400 | 400 | 400 | 400 | 400 | 400 | 200 | 250 |
| Melt kneading energy E (kWh/kg) |  | 0.25 | 0.20 | 0.20 | 0.25 | 0.25 | 0.25 | 0.10 | 0.14 |
| (B) component Feed Port location of biaxial extruder |  | Side | Side | Main | Main | Side | Main | Side | Side |
| Resin temperature at die outlet (° C.) |  | 350 | 350 | 350 | 350 | 350 | 340 | 320 | 330 |
| Charpy impact strength (notched) (kJ/m²) |  | 30 | 25 | 15 | 10 | 10 | 10 | 10 | 10 |
| Water presssure resistant strength (MPa) |  | 17 | 16 | 14 | 8 | 8 | 8 | 8 | 10 |
| Tensile strength (MPa) |  | 65 | 65 | 65 | 50 | 55 | 60 | 65 | 65 |
| Tensile elongation (%) |  | 11 | 12 | 12 | 8 | 6 | 10 | 10 | 11 |
| Weld tensile strength (MPa) |  | 60 | 55 | 50 | 45 | 45 | 45 | 50 | 50 |
| Weld tensile elongation (%) |  | 18 | 15 | 14 | 7 | 5 | 9 | 8 | 11 |
| Appearance of Molded article after 240° C., 500 hr treatment |  | uncracked | uncracked | uncracked | cracked | cracked | cracked | cracked | cracked |
| FDA authentication |  | unacquirable | unacquirable | unacquirable | acquirable | acquirable | acquirable | acquirable | acquirable |

Example 1

In Example 1 shown in Table 1, the entire amount of the aromatic vinyl compound block copolymer (B) was fed from the main feed port. The resulting mixture was melt-kneaded at a screw rotation speed of 400 rpm and a discharge amount of 40 kg/hr to obtain pellets. The thus obtained pellets were dried with hot air at 130° C. for 3 hours, and subjected to injection molding and morphology observation. Thereafter, the impact resistance strength and the water pressure-resistant breaking strength of the resulting injection molded article were evaluated. The resin temperature at the die exit and the evaluation results of the respective strengths were as shown in Table 1.

Examples 2 to 4

In each of Examples 2 to 4 shown in Table 1, the aromatic vinyl compound block copolymer (B) was fed from the main feed port and the side feed port. Each resulting mixture was melt-kneaded at a screw rotation speed of 400 rpm and a discharge amount of 40 kg/hr to obtain pellets. The thus obtained pellets were dried with hot air at 130° C. for 3 hours, and subjected to injection molding and morphology observation. Thereafter, the impact resistance strength and the water pressure-resistant breaking strength of each resulting injection molded article were evaluated. The resin temperature at the die exit and the evaluation results of the respective strengths, in each of the Examples, were as shown in Table 1.

Examples 5 to 7 and 10 to 13

In each of Examples 5 to 7 and 10 to 13 shown in Table 1 and Table 2, the aromatic vinyl compound block copolymer (B) was fed from the charging port shown in Table 1. Each resulting mixture was melt-kneaded at a screw rotation speed of 400 rpm and a discharge amount of 40 kg/hr to obtain pellets. The thus obtained pellets were dried with hot air at 130° C. for 3 hours, and subjected to injection molding and morphology observation. Thereafter, the impact resistance strength and the water pressure-resistant breaking strength of each resulting injection molded article were evaluated. The resin temperature at the die exit and the evaluation results of the respective strengths, in each of the Examples, were as shown in Table 1 or Table 2.

Example 8

In Example 8 shown in Table 1, the aromatic vinyl compound block copolymer (B) was fed from the side feed port. The resulting mixture was melt-kneaded at a screw rotation speed of 300 rpm and a discharge amount of 40 kg/hr to obtain pellets. The thus obtained pellets were dried with hot air at 130° C. for 3 hours, and subjected to injection molding and morphology observation. Thereafter, the impact resistance strength and the water pressure-resistant breaking strength of the resulting injection molded article were evaluated. The resin temperature at the die exit and the evaluation results of the respective strengths were as shown in Table 1.

Example 9

In Example 9 shown in Table 1, the aromatic vinyl compound block copolymer (B) was fed from the side feed port. The resulting mixture was melt-kneaded at a screw rotation speed of 400 rpm and a discharge amount of 20 kg/hr such that the resin temperature at the die exit was 410° C., to obtain pellets. The thus obtained pellets were dried with hot air at 130° C. for 3 hours, and subjected to injection molding and morphology observation. Thereafter, the impact resistance strength and the water pressure-resistant breaking strength of the resulting injection molded article were evaluated. The resin temperature at the die exit and the evaluation results of the respective strengths were as shown in Table 1.

Comparative Examples 1 to 3

In each of the Comparative Examples, the pellets obtained by melt-kneading under conditions shown in Table 2 were dried with hot air at 130° C. for 3 hours, and subjected to injection molding and morphology observation. Since the alkoxysilane compound (C) was not added in each of Comparative Examples 1 to 3, the number average dispersed particle size was increased regardless of the feeding method of the aromatic vinyl compound block copolymer (B), resulting in poor impact resistance and water pressure-resistant breaking strength.

Comparative Examples 4 and 5

In each of the Comparative Examples, the pellets obtained by melt-kneading under conditions shown in Table 2 were dried with hot air at 130° C. for 3 hours, and subjected to injection molding and morphology observation. Since the melt-kneading energy was small in each of Comparative Examples 4 and 5, the number average dispersed particle size was increased even though the aromatic vinyl compound block copolymer (B) was fed from the side feed port, resulting in poor impact resistance and water pressure-resistant breaking strength.

INDUSTRIAL APPLICABILITY

Our PPS resin composition can be suitably used not only in water supply faucet components and combination faucets to which a low water pressure is applied, but also in water application components that contact a hot water flow, and to which a high water pressure comparable to the direct pressure of water supply system or a high water pressure due to water hammer is applied because our PPS resin composition has an excellent impact resistance strength and water pressure resistance strength. In particular, the PPS resin composition can be suitably used in water application components that contact a liquid having a temperature of 70° C. or higher at a pressure of 0.3 MPa or more.

The invention claimed is:

1. A method of producing the polyphenylene sulfide resin composition which comprises:
   99.5 to 51 parts by weight of a polyphenylene sulfide resin (A);
   0.5 to 49 parts by weight of an aromatic vinyl compound block copolymer (B) containing at least one functional group selected from the group consisting of a carboxyl group, an acid anhydride group, a hydroxyl group, an amino group, an epoxy group and an isocyanate group; and
   0.1 to 2.0 parts by weight, with respect to 100 parts by weight of the total amount of said polyphenylene sulfide resin (A) and said aromatic vinyl compound block copolymer (B), of an alkoxy silane compound (C) containing at least one functional group selected from the group consisting of an epoxy group, an amino group and an isocyanate group;
   wherein a phase structure of said polyphenylene sulfide resin composition is a sea-island structure in which said polyphenylene sulfide resin (A) forms a sea phase, and said aromatic vinyl compound block copolymer (B) forms an island phase dispersed in a number average dispersed particle size of 1,000 nm or less,
   the method comprising:
   performing melt-kneading using a twin screw extruder having a ratio L/D of screw length L to screw diameter D of 10 or more, at a melt-kneading energy E (kWh/kg), represented by equation (2), of 0.15 kWh/kg or more and 0.50 kWh/kg or less:

$$E=\{(A/B)\times C\}/F \qquad (2)$$

wherein A represents a screw rotation speed (rpm) of said twin screw extruder during the melt-kneading; B represents a maximum screw rotation speed (rpm) of said twin screw extruder; C represents an output (kW) of a screw drive motor during the melt-kneading; and F represents a discharge amount (kg/h) of a molten resin during the melt-kneading,
   wherein said twin screw extruder includes:
   a cylinder;
   a main feed port provided to said cylinder; and
   a side feed port provided on a downstream side of said main feed port in an extrusion direction;
   wherein said aromatic vinyl compound block copolymer (B) is fed from said side feed port, and 80% to 98% by weight of the total amount of said aromatic vinyl compound block copolymer (B) is fed from said side feed port, and 2 to 20% by weight of said aromatic vinyl compound block copolymer (B) is fed from said main feed port.

2. The method according to claim 1, wherein the screw rotation speed of said twin screw extruder is 300 rpm or more.

3. The method according to claim 1, wherein the resin temperature at a die exit of said twin screw extruder is 400° C. or lower.

* * * * *